(12) United States Patent
Horiuchi (10) Patent No.: US 7,556,275 B2
(45) Date of Patent: Jul. 7, 2009

(54) SADDLE TYPE VEHICLE

(75) Inventor: Toru Horiuchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 306 days.

(21) Appl. No.: 11/209,878

(22) Filed: Aug. 23, 2005

(65) Prior Publication Data

US 2006/0054371 A1     Mar. 16, 2006

(30) Foreign Application Priority Data

Sep. 13, 2004    (JP)    ............................. 2004-265957

(51) Int. Cl.
*B62K 19/18*    (2006.01)

(52) U.S. Cl. ........................ 280/284; 280/228; 280/227; 280/285; 280/275; 280/286; 280/288

(58) Field of Classification Search ................ 280/284, 280/285, 286, 275, 288, 227, 228; 180/227, 180/228, 220
See application file for complete search history.

(56) References Cited

U.S. PATENT DOCUMENTS

| | | | | |
|---|---|---|---|---|
| 3,948,543 A | * | 4/1976 | Macdonald et al. | ......... 280/284 |
| 4,114,918 A | * | 9/1978 | Lutz | ............................ 280/284 |
| 4,346,772 A | * | 8/1982 | Clifft | ........................... 180/11 |
| 4,433,850 A | * | 2/1984 | Miyakoshi et al. | .......... 280/277 |
| 4,744,579 A | * | 5/1988 | Roatta | ......................... 280/275 |
| 4,805,717 A | * | 2/1989 | Trema | ......................... 180/219 |
| 5,356,165 A | * | 10/1994 | Kulhawik et al. | ........... 280/275 |
| 5,487,442 A | * | 1/1996 | Hua | ............................. 180/220 |
| 5,487,443 A | * | 1/1996 | Thurm | ........................ 180/227 |
| 5,816,357 A | * | 10/1998 | Camlin | ........................ 180/227 |
| 5,842,535 A | * | 12/1998 | Dennis | ........................ 180/205 |
| 5,941,332 A | * | 8/1999 | Dimick | ........................ 180/205 |
| 6,640,922 B2 | * | 11/2003 | Nakagawa | ................... 180/227 |
| 6,964,313 B2 | * | 11/2005 | Phillips et al. | ................. 180/205 |
| 7,150,337 B2 | * | 12/2006 | Phillips et al. | ............... 180/205 |
| 7,178,621 B2 | * | 2/2007 | de Groot | ...................... 180/227 |

FOREIGN PATENT DOCUMENTS

JP    3334931 B2    8/2002

* cited by examiner

*Primary Examiner*—Lesley D. Morris
*Assistant Examiner*—Marlon A Arce Diaz
(74) *Attorney, Agent, or Firm*—Keating & Bennett, LLP (57) ABSTRACT

A saddle type vehicle includes a down tube extending downward from a head pipe for supporting a front fork, a rear wheel pivot unit provided on the down tube, and a rear wheel suspension device for supporting a rear wheel of the vehicle such that the rear wheel can pivot substantially upward and downward around the rear wheel pivot unit. The rear wheel pivot unit is disposed before an engine in the advancing direction of the vehicle. The engine is attached to the rear wheel suspension device such that the engine can pivot with the rear wheel suspension device.

16 Claims, 8 Drawing Sheets

SADDLE TYPE VEHICLE

BACKGROUND OF THE INVENTION

1. Field of the Invention

The present invention relates to a saddle type vehicle having a saddle in which a rider sits astride the saddle, such as a motorcycle, and more particularly, the present invention relates to a vehicle frame structure of the saddle type vehicle.

2. Description of the Related Art

For a saddle type two to four-wheeled vehicle having a saddle in which a rider sits astride the saddle, various types of vehicle frame structures have been proposed and provided so as to enhance running stability and reduce manufacturing costs.

It has been proposed to provide a vehicle frame structure of a motorcycle in which two pairs of swing arms each separately support a front wheel or a rear wheel connected to the vehicle frame, for example, such a structure that a shock absorber unit constituted by a damper and others is disposed below the swing arms. See Japanese Patent No. 3,334,931 (pp. 2-3, FIG. 1).

The vehicle frame of this type has a simple structure and high rigidity. Moreover, since the center of gravity of the motorcycle is located at a lower position in this vehicle frame structure, running stability of the motorcycle is enhanced.

In the field of a saddle type vehicle such as a motorcycle, however, there is always a demand for a more attractive saddle type vehicle which is more competitive in the market.

The above-described vehicle frame structure offers certain advantages in enhancement of running stability of a saddle type vehicle, but development of an improved saddle type vehicle having more enhanced running stability has been demanded.

SUMMARY OF THE INVENTION

In order to overcome the problems described above, preferred embodiments of the present invention provide a saddle type vehicle which includes an improved vehicle frame so as to further enhance running stability of the vehicle.

A saddle type vehicle according to a preferred embodiment of the present invention includes a downward frame extending downward from a steering shaft support member for supporting a steering shaft, a rear wheel pivot section provided on the downward frame, and a rear wheel suspension device for supporting a rear wheel such that the rear wheel can pivot substantially upward and downward around the rear wheel pivot section. In this saddle type vehicle, the rear wheel pivot section is disposed before a power unit in the advancing direction of the vehicle and the power unit is attached to the rear wheel suspension device such that the power unit can pivot.

In the structure according to a preferred embodiment of the present invention described above, the distance between the rear wheel pivot section and the rotational shaft of the rear wheel is longer than that of a conventional saddle type vehicle in which the rear wheel pivot section is disposed behind the power unit, such as an engine.

As a result, the radius of the circle made by the rear wheel, which pivots substantially upward and downward around the rear wheel pivot section, which makes circular motion around the rear wheel pivot section, becomes longer. Thus, the direction of the driving reaction generated by the revolutions of the rear wheel on a road surface is lowered.

Consequently, the possibility of the rising tendency of the front wheel of the saddle type vehicle at the time of variation of the driving reaction, such as acceleration, is reduced, and thus running stability of the saddle type vehicle is further enhanced.

According to a preferred embodiment of the present invention, the power unit is attached to the rear wheel suspension device such that the power unit can pivot. Thus, the distance between the power unit and the rear wheel can be kept constant even when the rear wheel pivots substantially upward and downward around the rear wheel pivot section.

As a result, the tension of a drive chain (or drive belt) attached between the power unit and the rear wheel is kept substantially constant, whereby a variation of power transmitted through the drive chain to the rear wheel can be prevented.

According to another preferred embodiment of the present invention, a saddle type vehicle according to the above-described preferred embodiment has a rear wheel pivot section including an elastic member and a rear wheel suspension device connected to the downward frame via the elastic member.

According to a further preferred embodiment of the present invention, the saddle type vehicle preferably includes foot rests projecting in the vehicle width direction. In this saddle type vehicle, a rear wheel pivot section width ($W_P$) as a width of the rear wheel pivot section in the vehicle width direction, a foot rest width ($W_{FR}$) as a width of the foot rests in the vehicle width direction, and a rear wheel width ($W_T$) as a width of the rear wheel in the vehicle width direction have a relationship of: the foot rest width ($W_{FR}$)$\geq$ the rear wheel pivot section width ($W_P$)$\geq$ the rear wheel width ($W_T$).

According to yet another preferred embodiment of the present invention, the rear wheel suspension device preferably includes a connecting member connected with the rear wheel pivot section and an arm member, one end of which is connected with the connecting member at the back of the connecting member and the other end of which supports the rear wheel, wherein the connecting member and the arm member are releasably connected to each other.

According to a further preferred embodiment of the present invention, a saddle type vehicle also preferably includes front wheel arms provided on the downward frame to support a front wheel of the saddle type vehicle such that the front wheel can move substantially upward and downward.

According to the various preferred embodiments of the present invention, it is possible to provide a saddle type vehicle having greatly enhanced running stability due to the improvement of a vehicle frame structure.

A saddle type vehicle according to various preferred embodiments is hereinafter described with reference to the appended drawings. In the following figures, identical or similar reference numerals have been given to identical or similar components. However, it should be noted that the figures are only schematic and respective ratios and the like shown in the figures may differ from actual values. In this context, specific dimensions and the like should be determined on the basis of the following description. Also, as apparent, different dimensional relationships and ratios are included among the respective figures.

Other features, elements, characteristics and advantages of the present invention will be apparent from the following detailed description of preferred embodiments with reference to the attached drawings.

DETAILED DESCRIPTION OF PREFERRED EMBODIMENTS

Figure 1:
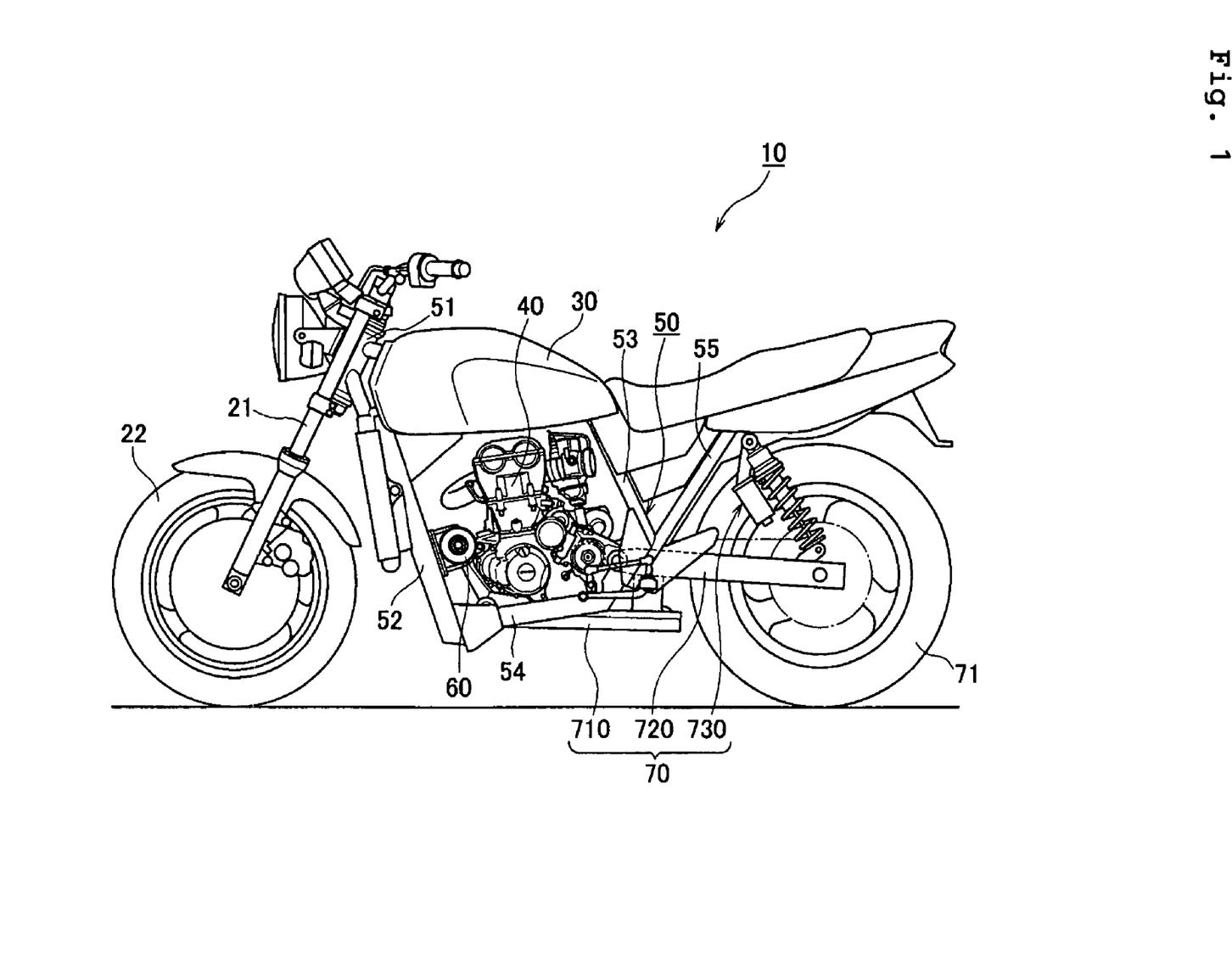
FIG. 1 is a left side view of a motorcycle.

FIG. 1 is a left side view illustrating a general structure of a motorcycle 10 as a saddle type vehicle according to a preferred embodiment of the present invention. As illustrated in FIG. 1, the motorcycle 10 has a vehicle frame 50 defining a framework of the motorcycle 10, and various components are attached to the vehicle frame 50.

The vehicle frame 50 includes a head pipe 51, a down tube 52, an upper rail 53, a lower rail 54, and a rear rail 55. The vehicle frame 50 further includes other rails, such as a rail (not shown) for connecting the upper rail 53 and the rear rail 55.

The head pipe 51 supports a front fork 21 (steering shaft), which constitutes a steering shaft support member in the present preferred embodiment. More specifically, the front fork 21 is supported by the head pipe 51 such that the front fork 21 turns to the right and left with respect to the advancing direction of the vehicle. The front fork 21 rotatably supports a front wheel 22 and shifts (linearly moves) the front wheel 22 upward and downward (in reality, in the direction to which a predetermined caster angle is given) according to the variable conditions of a road surface so as to absorb the impact applied to the front wheel 22.

The down tube 52 extends downward from the head pipe 51, which constitutes a downward frame in the present preferred embodiment. The down tube 52 preferably has a substantially cylindrical or substantially rectangular shape in the present preferred embodiment. A rear wheel pivot unit 60 (rear wheel pivot section) is provided on the down tube 52.

The lower rail 54 extends from the lower end of the down tube 52 toward the rear of the motorcycle 10. The upper rail 53 extends from the head pipe 51 through a space formed within a fuel tank 30. The lower rail 54 is connected with the upper rail 53 behind an engine 40.

The rear wheel pivot unit 60 is positioned before the engine 40 (power unit) in the advancing direction of the vehicle. A rear wheel suspension device 70 is connected with the rear wheel pivot unit 60.

The rear wheel suspension device 70 supports a rear wheel 71 such that the rear wheel 71 can pivot substantially upward and downward around the rear wheel pivot unit 60. In the present preferred embodiment, the rear wheel suspension device 70 includes a connecting member 710, an arm member 720, and a rear shock absorber unit 730.

The connecting member 710 is connected with the rear wheel pivot unit 60. One end (end $E_1$, see FIG. 4) of the arm member 720 in the longitudinal direction is connected with the rear region of the connecting member 710, while the other end (end $E_2$, see FIG. 4) rotatably supports the rear wheel 71.

The connecting member 710 and the arm member 720 are releasably attached to each other. The detailed structure of the rear wheel suspension device 70 including the connecting member 710 and the arm member 720 will be discussed later.

The rear shock absorber unit 730 supports the connecting member 710 and the arm member 720 both pivoting around the rear wheel pivot unit 60 at predetermined positions of the rear shock absorber unit 730. The rear shock absorber unit 730 allows the rear wheel 71, rotatably supported by the arm member 720, to shift substantially upward and downward (circular motion about a first axis at the rear wheel pivot unit 60), thereby absorbing the impact applied to the rear wheel 71.

The engine 40 is attached to the rear wheel suspension device 70, more specifically, to the connecting member 710. Thus, the engine 40 is capable of pivoting around the rear wheel pivot unit 60 with the connecting member 710.

A foot rest 81 and a change pedal 82 extending from the foot rest 81 are provided on the left side of the motorcycle 10. Another foot rest 81 and a rear brake pedal 83 (see FIG. 3) are disposed on the right side of the motorcycle 10.

Next, the rear wheel pivot unit 60 and the rear wheel suspension device 70 are explained in detail.

Figure 2:
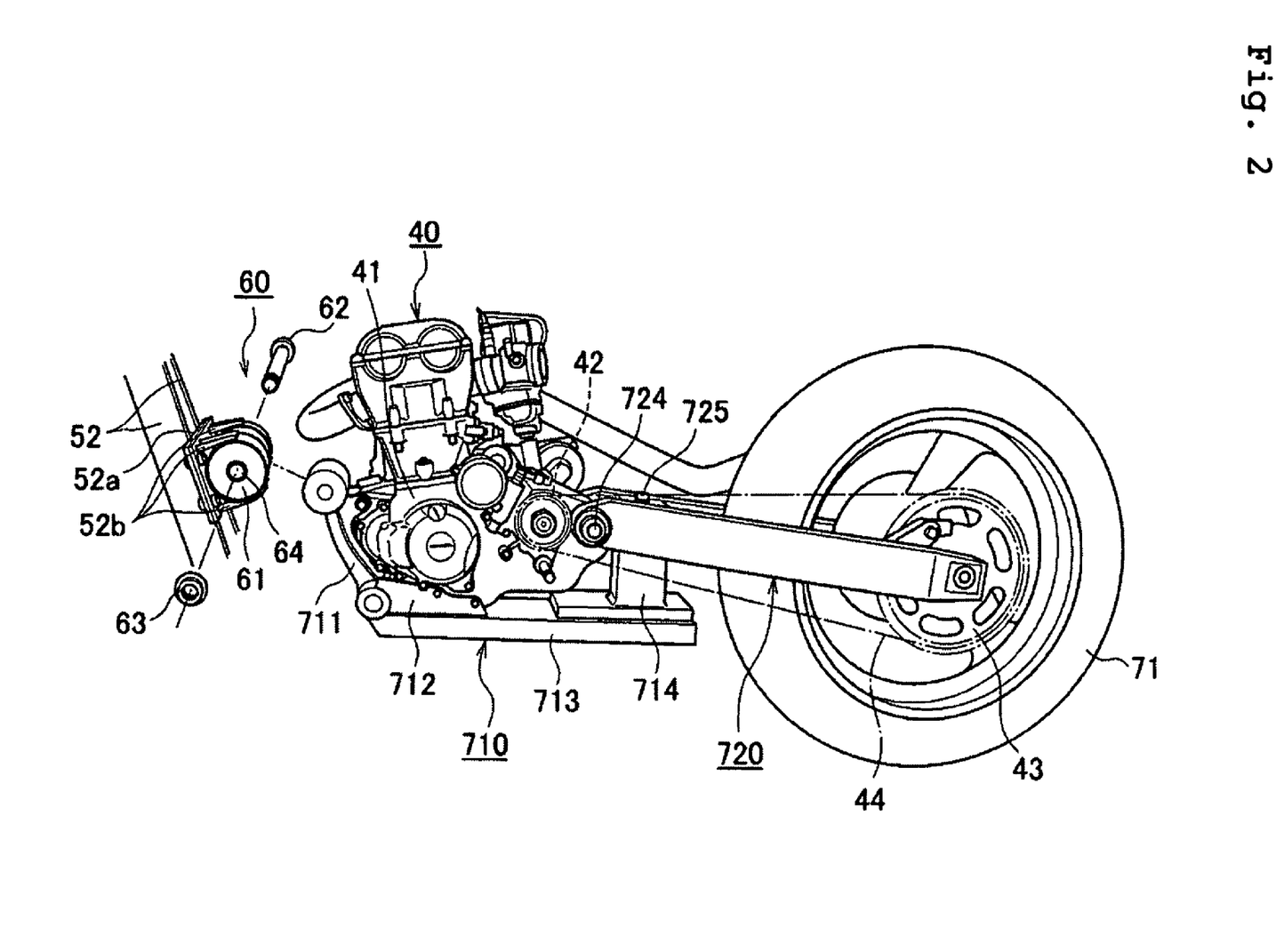
FIG. 2 is a partial left side view of the motorcycle including a rear wheel pivot section and a rear wheel suspension device.

FIG. 2 illustrates a part of the left side of the motorcycle 10 including the rear wheel pivot unit 60 and the rear wheel suspension device 70.

As illustrated in this figure, the down tube 52 has a base 52a to which the rear wheel pivot unit 60 is attached. The base 52a has holding members 52b for holding the rear wheel pivot unit 60 such that the unit 60 is sandwiched between the holding members 52b.

The rear wheel pivot unit 60 is attached to the down tube 52 via the base 52a and the holding members 52b. The rear wheel pivot unit 60 has a rubber bushing 61, a pivot bolt 62, and a pivot nut 63.

The rubber bushing 61 is an elastic component made of a rubber material, or any other elastic material. The rubber bushing 61 is preferably substantially cylindrical in the preferred embodiment, but may have other shapes such as the shape of a pantograph.

Metal fittings (not shown) welded to the holding members 52b are provided on the outer circumferential surface of the rubber bushing 61. Also, metal fittings (not shown) for contacting the pivot bolt 62 are provided on the circumferential wall surface of a circular hole 64 through which the pivot bolt 62 is inserted.

The pivot bolt 62 is inserted through the circular hole 64 and supports the connecting member 710 such that the connecting member 710 can pivot substantially upward and downward about the first axis (that is, about the pivot bolt 62). One end of the pivot bolt 62 is screwed into the pivot nut 63.

The connecting member 710 constitutes a part of the rear wheel suspension device 70 and includes a connecting section 711, an engine fixing plate 712, a base plate 713, and an arm member connecting section 714.

More specifically, the connecting section 711 is supported by the rear wheel pivot unit 60 by the pivot bolt 62, which is inserted through the circular hole 64 formed on the rubber bushing 61, such that the connecting section 711 can pivot. Thus, the rear wheel suspension device 70 is connected with the down tube 52 via the rubber bushing 61.

As mentioned above, the engine 40 is attached to the rear wheel suspension device 70 through the connecting member 710 such that the engine can pivot. More specifically, the front region of a crank case 41 is fixed to the connecting section 711.

The lower side of the crank case 41 is fixed to the engine fixing plate 712. The arm member 720 is attached to the rear region of the crank case 41 using an arm connecting bolt 724.

The arm member 720 rotatably supports the rear wheel 71 and is fixed to the arm member connecting section 714 using a fixing bolt 725.

Since the connecting section 711, the engine fixing plate 712, and the arm member 720 are attached to the engine 40, the engine 40 is also used as a reinforcing member of the rear wheel suspension device 70.

The power from the engine 40 is transmitted through a drive sprocket 42 and a drive chain 44 to a driven sprocket 43, whereby the rear wheel 71 is rotated with the driven sprocket 43.

Figure 3:
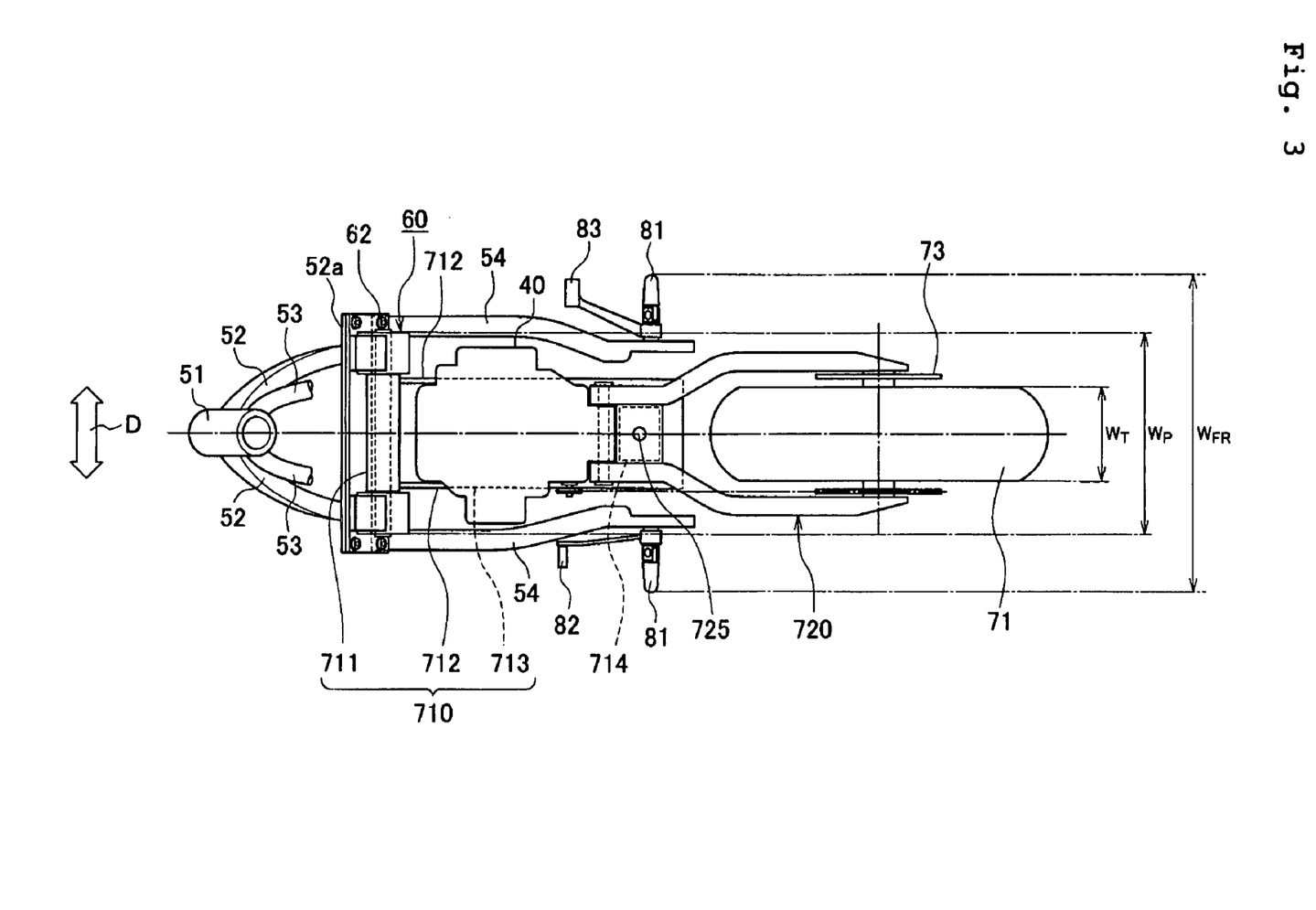
FIG. 3 is a partial plan view of the motorcycle.

FIG. 3 is a partial plan view of the motorcycle 10. As illustrated in this figure, the foot rest 81 projecting in the vehicle width direction D (direction in the figure) is provided on each of the right and left sides of the motorcycle 10.

The change pedal 82 for changing transmission gears included in a transmission (not shown) extends from the foot rest 81 provided on the left side of the motorcycle 10. The rear brake pedal 83 which controls the braking force of a rear brake 73 for braking rotations of the rear wheel 71 extends from the foot rest 81 provided on the right side of the motorcycle 10.

As described above, the connecting section 711 is supported by the pivot bolt 62 such that the connecting section 711 can pivot substantially upward and downward about the first axis, and the arm member 720 is attached to the connecting member 710 (more specifically, the arm member connecting section 714) using the fixing bolt 725.

Thus, the rear wheel 71 is so supported as to pivot substantially upward and downward around the rear wheel pivot unit 60 (the first axis), and the actual arm length for supporting the rear wheel 71 is larger than that of a conventional motorcycle in which the rear wheel 71 is supported so as to pivot substantially upward and downward around the vicinity of the back of the engine 40.

Since the engine 40 is attached to the connecting member 710, the engine 40 pivots substantially upward and downward when the rear wheel 71 pivots substantially upward and downward around the rear wheel pivot unit 60.

In the present preferred embodiment, a rear wheel pivot unit width (rear wheel pivot section width) $W_P$ as a width of the rear wheel pivot unit 60 in the vehicle width direction D (direction in the figure), a foot rest width $W_{FR}$ as a width of the pair of the right and left foot rests 81 in the vehicle width direction, and a rear wheel width $W_T$ as a width of the rear wheel 71 in the vehicle width direction have the following relationship: foot rest width ($W_{FR}$) $\geq$ rear wheel pivot unit width ($W_P$) $\geq$ rear wheel width ($W_T$).

Next, the detailed structure of the rear wheel suspension device 70, more specifically, the connecting member 710 and the arm member 720 and their surrounding parts constituting the rear wheel suspension device 70 are described with reference to FIG. 4.

Figure 4:
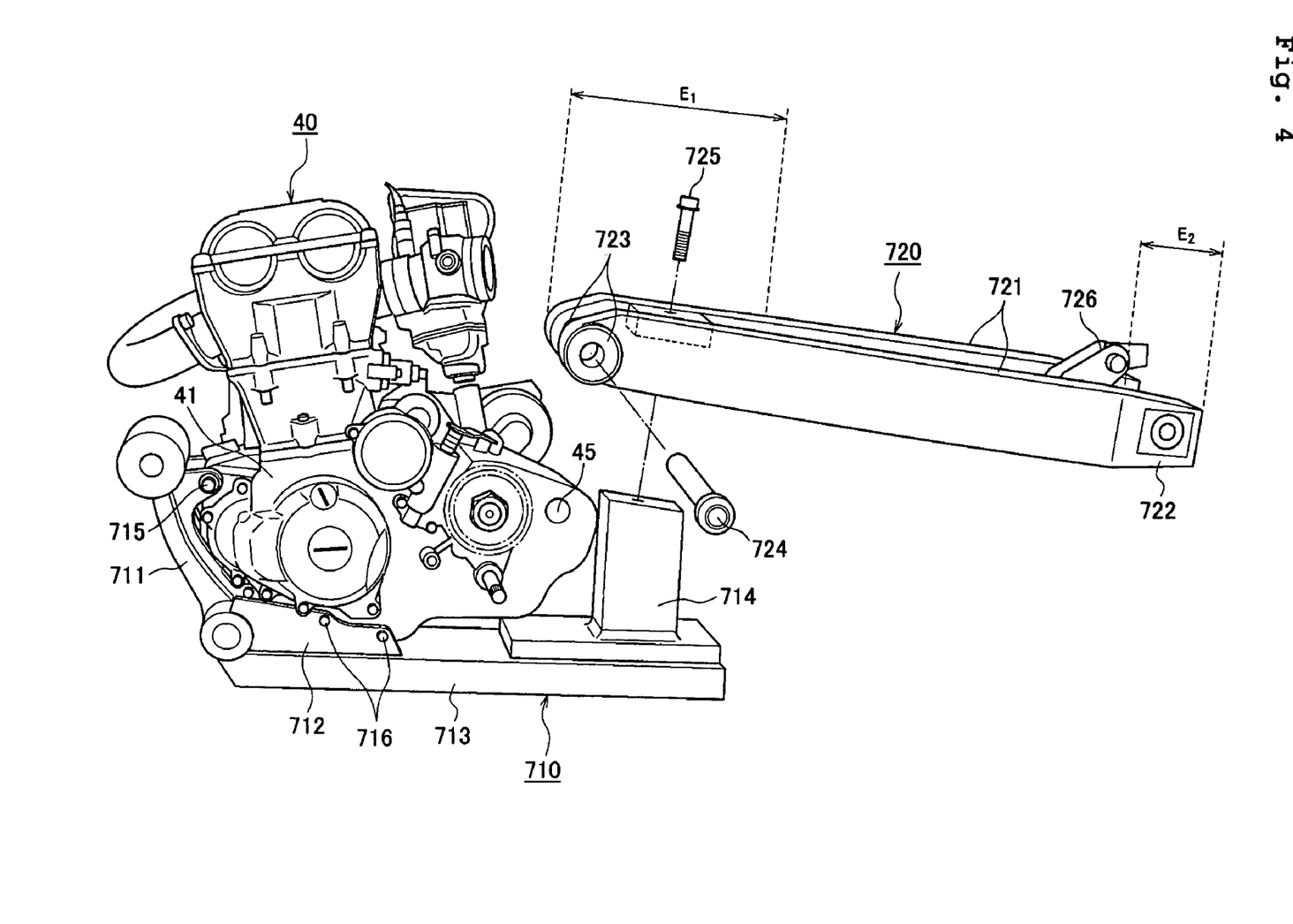
FIG. 4 illustrates detailed structures of a connecting member and an arm member constituting the rear wheel suspension device.

As illustrated in FIG. 4, the front region of the crank case 41 is attached to the connecting section 711 using an attaching screw 715. The lower side of the crank case 41 is attached to the engine fixing plate 712 using attaching screws 716.

In the present preferred embodiment, the connecting section 711, the engine fixing plate 712, and the arm member connecting section 714 constituting the connecting member 710 are joined to the base plate 713 by welding, nuts and bolts, or any other structure.

An arm connecting hole 45 through which the arm connecting bolt 724 is inserted is provided on the rear region of the crank case 41.

The arm member 720 includes an arm section 721, a rear shaft support section 722, and a connecting section 723. The end $E_1$ (one end) of the arm section 721 is secured to the arm member connecting section 714 of the connecting member 710 using the fixing bolt 725. A rear shock absorber unit connecting section 726 is attached to the arm section 721 to connect the lower end of the rear shock absorber unit 730 to the arm section 721.

The rear shaft support section 722 is provided at the end $E_2$ (the other end) to rotatably support a rotational shaft (not shown) of the rear wheel 71. The connecting section 723 is disposed at the end $E_1$ and has a circular hole that can be superimposed with the arm connecting hole 45 through which the arm connecting bolt 724 is inserted.

It is not necessarily required that the crank case 41 be connected with the arm member 720 by the arm connecting bolt 724. For example, the crank case 41 may be connected with the arm member connecting section 714.

Next, the operation and advantages of the motorcycle 10 are discussed with reference to FIGS. 5, 6(*a*) and 6(*b*).

Figure 5:
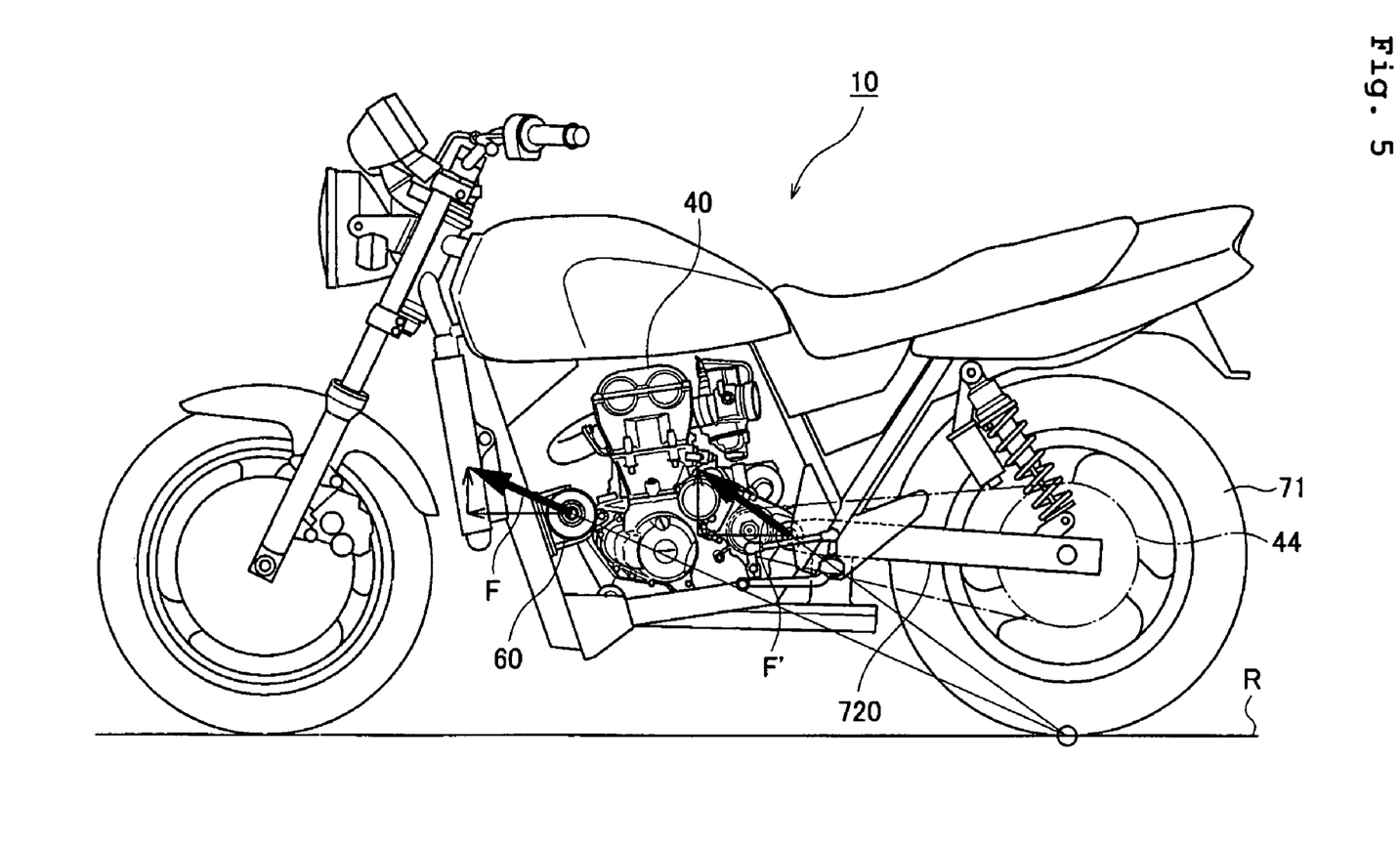
FIG. 5 explains the operation and advantages of the motorcycle.

FIG. 5 is an explanatory view showing that a rising tendency, which causes the front wheel 22 of the motorcycle 10 to rise at the time of a variation in driving reaction, such as acceleration, is reduced in the motorcycle 10 as compared with a conventional motorcycle in which the rear wheel pivot section is disposed behind the engine 40.

As illustrated in FIG. 5, since the rear wheel 71 makes a circular motion about a first axis at the rear wheel pivot unit 60 in the motorcycle 10, the driving reaction generated by the revolutions of the rear wheel 71 on a road surface R is directed substantially in a direction indicated by an arrow F.

On the other hand, in a conventional motorcycle in which the rear wheel pivot section is disposed behind the engine 40, the rear wheel pivot section is located around the connecting point between the arm member 720 and the engine 40. Thus, the rear wheel 71 makes a circular motion around this connecting point. In this case, driving reaction produced by the revolutions of the rear wheel 71 on the road surface R is directed substantially in a direction indicated by an arrow F'.

Accordingly, in the present preferred embodiment, the distance between the rear wheel pivot section and the rear wheel 71 is longer and thus the radius of the circular motion around the rear wheel pivot section by the rear wheel 71 is larger, compared with that of a conventional motorcycle in which the rear wheel pivot section is provided behind the engine 40.

As a result, the direction of the driving reaction generated by the revolutions of the rear wheel 71 on the road surface is lowered, which reduces the possibility of the rising tendency of the front wheel 22 at the time of variation of the driving reaction; such as acceleration, and further enhances running stability of the motorcycle 10.

More specifically, due to the reduction of the rising tendency, it is possible to give such a feeling to the rider that the motorcycle 10 is running forward more directly when an accelerator throttle is full-open, or on other occasions.

Additionally, in the preferred embodiment, the engine 40 is attached to the rear wheel suspension device 70 such that the engine 40 can pivot. Thus, even when the rear wheel 71 pivots substantially upward and downward around the rear wheel pivot unit 60 (first axis), the distance between the engine 40 and the rear wheel 71 is kept constant.

Consequently, the tension of the drive chain 44 attached between the engine 40 and the rear wheel 71 is kept substantially constant, whereby variation of the power transmitted through the drive chain 44 to the rear wheel 71 can be prevented.

Figure 6A:
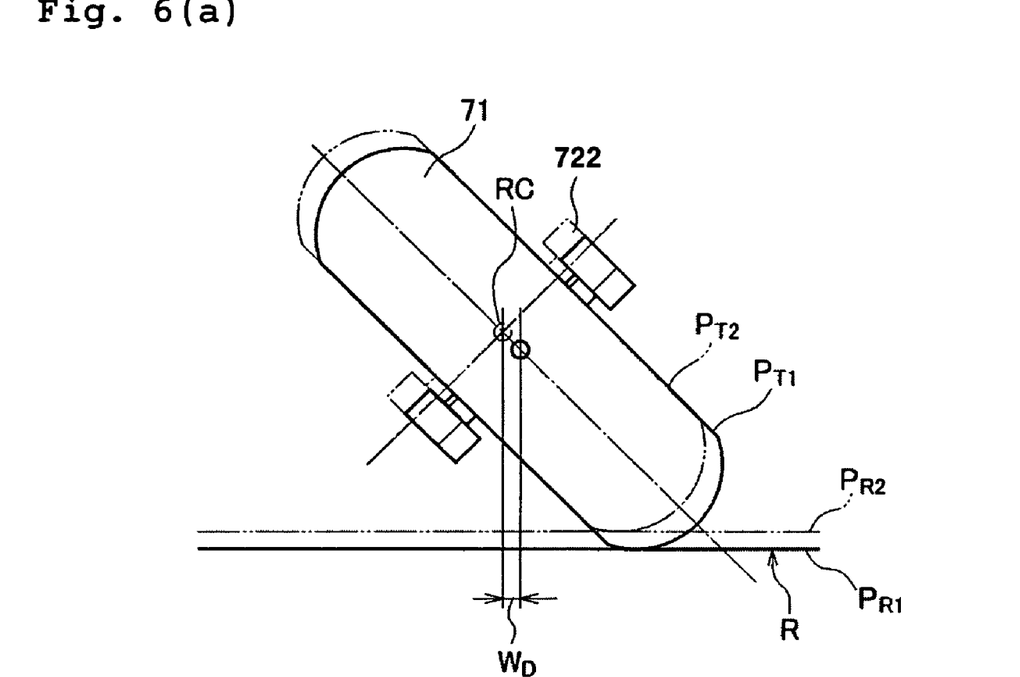
FIGS. 6(a) and 6(b) further explain the operation and advantages of the motorcycle.
Figure 6B:
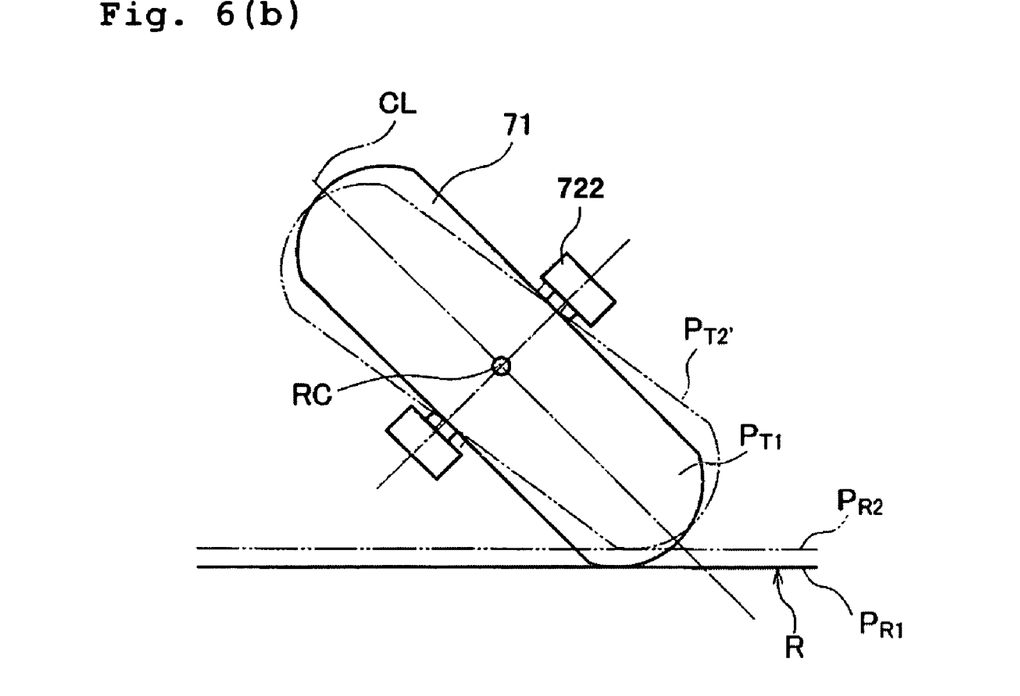

FIGS. 6(*a*) and 6(*b*) explain further operations and advantages provided by the motorcycle 10 of the present preferred embodiment. As mentioned above, the rubber bushing 61 is used in the rear wheel pivot unit 60.

FIG. 6(*a*) shows the movement of the rear wheel 71 during cornering of a motorcycle in which the rear wheel pivot unit 60 includes a component having a higher hardness, i.e., higher rigidity than that of the rubber bushing 61 in place of the rubber bushing 61, while FIG. 6(b) shows the movement of the rear wheel 71 during cornering of the motorcycle 10.

As illustrated in FIG. 6(a), the road surface R has an upward and downward undulation. Thus, the position of the rear wheel 71 rotating on the road surface R moves to positions in the range of $P_{T1}$ and $P_{T2}$ when the rear wheel 71 rolls on road surface R positions $P_{R1}$ through $P_{R2}$. That is, the motorcycle is affected by irregular external conditions.

The rear wheel 71 of the motorcycle in which the rear wheel pivot unit 60 has the component having a higher hardness than that of the rubber bushing 61 pivots around the rear wheel pivot unit 60. As a result, a rotational center RC of the rear wheel 71 shifts as illustrated in FIG. 6(a).

More specifically, in the motorcycle in which the rear wheel pivot unit 60 has the component having higher hardness than that of the rubber bushing 61, the rotational center RC of the rear wheel 71 shifts by a width $W_D$ in the vehicle width direction due to the undulation of the road surface R.

When the rotational center RC of the rear wheel 71 is shifted during cornering in this way, the rider of the motorcycle feels that the grip of the rear wheel 71 has been changed. On the other hand, in the motorcycle 10 in which the rear wheel pivot unit 60 has the rubber bushing 61, the rubber bushing 61 deforms in accordance with the load variation during cornering as illustrated in FIG. 6(b). Due to the deformation of the rubber bushing 61, the position of the rear wheel 71 changes to a position $P_{T2'}$ at a road surface R position $P_{R2}$ (for example, a convex portion of the road surface R).

Thus, the position of the rotational center RC of the rear wheel 71 does not greatly shift while the vehicle is passing over the undulation (convex portion) of the road surface R, compared with the structure shown in FIG. 6(a). More specifically, the rear wheel suspension device 70 does not move up and down significantly but the rear wheel 71 (center line CL) is twisted and inclined about a second axis at the rotational center RC while the vehicle is passing over the undulation (convex portion) of the road surface R. As a result, the effects of irregular external conditions on the vehicle frame 50, and thus the motorcycle 10, are reduced. The twisting of the rear wheel 71 about the second axis at the rotational center RC is due to the deformation of the rubber bushing 61. The second axis passes through the rubber bushing 61 and is, thus, perpendicular to the first axis at the rear wheel pivot unit 60 about which the rear wheel 71 moves in a circular motion.

Accordingly, the rider of the motorcycle feels that the grip of the rear wheel 71 does not greatly change but is kept almost constant while the vehicle is passing over undulations of the road surface R. In other words, the rider feels that the rear wheel 71 is maintained within an appropriate angle range (camber angle range) by the grip of the rear wheel 71 during cornering.

As described above, the rear wheel pivot unit width $W_P$, the foot rest width $W_{FR}$, and the rear wheel width $W_T$ have the relationship: foot rest width $(W_{FR}) \geqq$ rear wheel pivot unit width $(W_P) \geqq$ rear wheel width $(W_T)$.

Thus, in order to enhance the rigidity of the rear wheel suspension device 70 while securing the operation and advantages shown in FIG. 6(b), it is preferable to enlarge the rear wheel pivot unit width $W_P$ while preventing contact between the road surface R and the end of the rear wheel pivot unit 60 in the vehicle width direction at the time of cornering or other occasions, for example, while securing a certain banking angle.

Other operations and advantages of the motorcycle 10 according to preferred embodiments of the present invention are further explained below. In the motorcycle 10, the connecting member 710 and the arm member 720 are releasably coupled to each other. Also, the engine 40 is attached to the connecting member 710 such that the engine 40 can pivot in the motorcycle 10.

Thus, the vehicle frame 50 can be assembled to other saddle type vehicles (such as on-road vehicles and off-road vehicles) by changing the type of the engine (power unit), the length of the arm member 720, or other alterations.

Accordingly, in the motorcycle 10 in the present preferred embodiment, it is possible to use the vehicle frame 50 in common with saddle type vehicles from different categories (as a platform) and thus reduce the manufacturing cost of the motorcycle 10.

Moreover, in the motorcycle 10 in the present preferred embodiment, the rear wheel pivot unit 60 is disposed on the down tube 52 and the connecting member 710 and the arm member 720 are releasably connected with each other. Thus, a saddle type vehicle having different maneuverability in which a fixed arm length is secured but a wheel base length is shortened can be easily provided.

While preferred embodiments according to the present invention has been described above, it should be understood that the present invention is not limited to the statements and drawings shown herein because those constitute only a part of the invention. Obviously, various alternative embodiments including changes and modifications can be carried out by those skilled in the art based on this specification.

Figure 7:
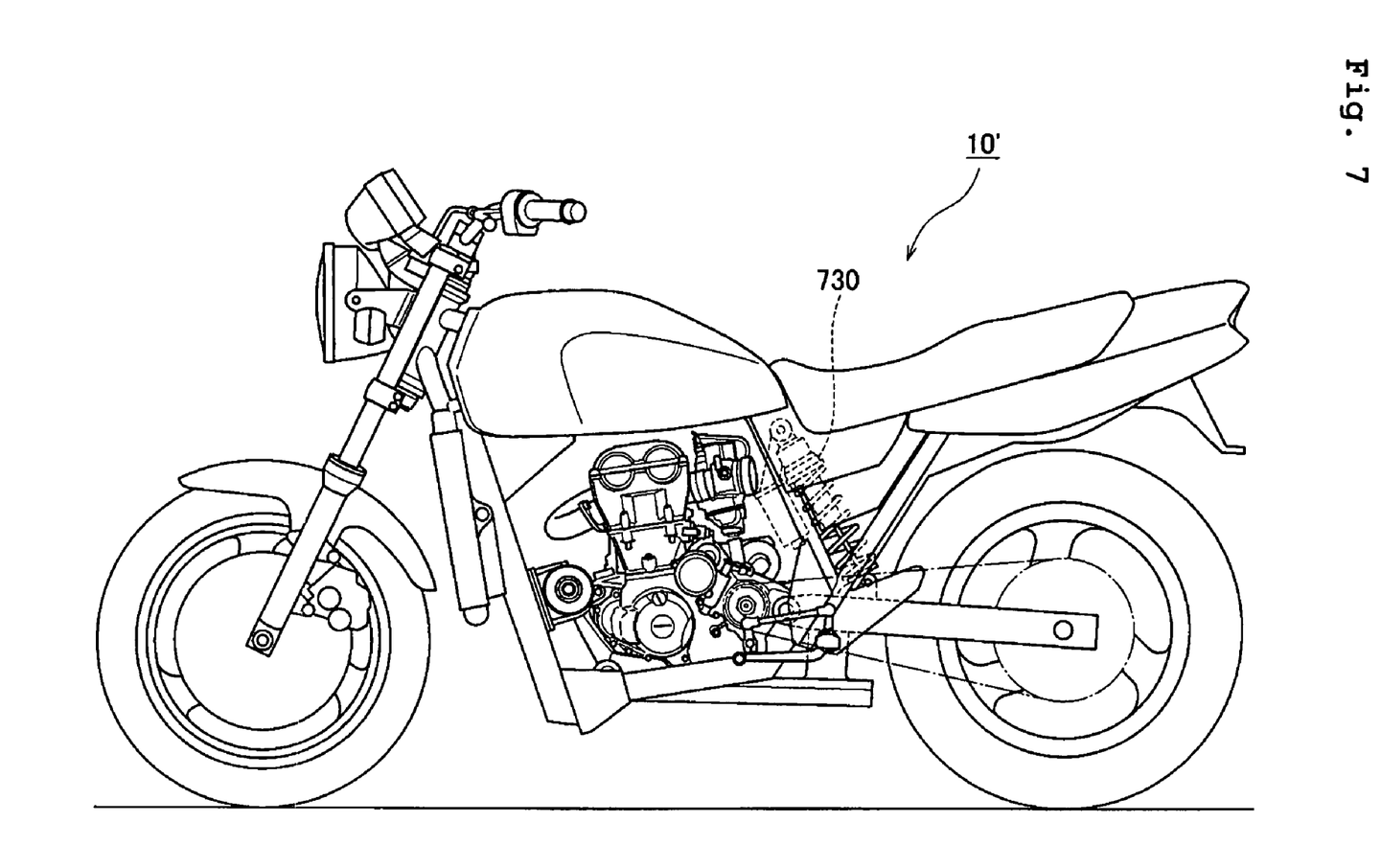
FIG. 7 is a left side view of a motorcycle according to a first modification.

For example, the following modifications may be made to the motorcycle 10 in the above described preferred embodiments. FIG. 7 is a left side view of a motorcycle 10' of a modified preferred embodiment according to the present invention.

In the motorcycle 10' of FIG. 7, the attachment position of the rear shock absorber unit 730 is shifted toward the front as compared to its position in the structure of the above motorcycle 10. The attachment position of the rear shock absorber unit 730 may be appropriately changed according to the categories and required performance of the motorcycle 10.

While a single set of the rear shock absorber unit 730 (mono-suspension) may be used in the motorcycles 10 and 10', two sets of the rear shock absorber units 730 may also be used. Furthermore, a link type mono-suspension may be used in the motorcycle 10', for example.

Figure 8:
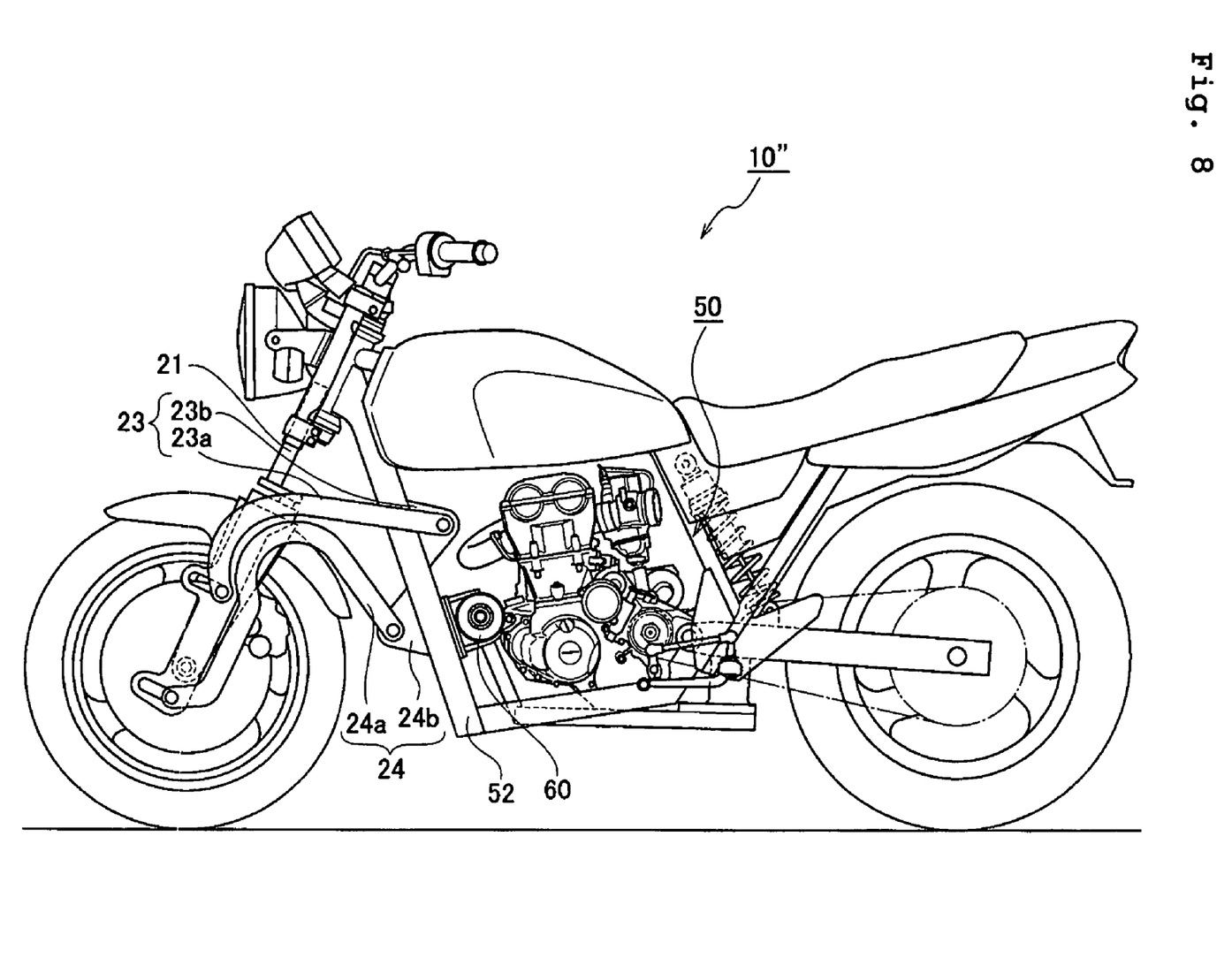
FIG. 8 is a left side view of a motorcycle according to another modification.

FIG. 8 is a left side view of a motorcycle 10'' according to another modification of the preferred embodiments of the present invention. As illustrated in FIG. 8, front wheel arms 23 and 24 for supporting the front wheel 22 such that the front wheel can shift substantially upward and downward are provided on the down tube 52.

More specifically, one end of a front arm member 23a is connected to the front fork 21, while the other end thereof is connected to a front wheel pivot section 23b. Similarly, one end of a front arm member 24a is connected to the front fork 21, while the other end thereof is connected to a front wheel pivot section 24b.

In the motorcycle 10'' having the front wheel arms 23 and 24, the components requiring high rigidity are provided within a narrow area, from the front wheel pivot section 23b to the rear wheel pivot unit 60. Thus, a vehicle frame having high rigidity can be easily provided.

While the engine 40 is preferably provided as a power unit on the motorcycle 10 in the above-described preferred embodiment, an electric motor may be used, for example, in place of the engine 40 in the motorcycle 10.

While the connecting member 710 and the arm member 720 are releasably coupled to each other in the motorcycle 10 in the above-described preferred embodiment, the connecting member 710 and the arm member 720 may be formed integrally with each other.

Additionally, while the rear wheel pivot unit width $W_P$, the foot rest width $W_{FR}$, and the rear wheel width $W_T$ have the relationship of: foot rest width $(W_{FR}) \geqq$ rear wheel pivot unit width $(W_P) \geqq$ rear wheel width $(W_T)$ in the motorcycle 10 in the above preferred embodiment, those values are not necessarily required to have this relationship.

Furthermore, while the present invention has been explained showing the motorcycle 10 as an example in the above-described preferred embodiments, it is obvious that the present invention may be applied to other saddle type vehicles, such as saddle type vehicles having three or four wheels, for example. The saddle type vehicles refer to two to four-wheeled vehicles having a saddle on which a rider sits astride as described above, and also include motor scooters having a foot board on which both feed of a rider are placed.

As described above, it is obvious that various modifications and changes which are not included herein may be included in the present invention, and thus the technical scope of the invention is limited only by the specific features of the present invention within the range of the appended claims which are appropriately claimed based on the above description.

What is claimed is:

1. A saddle type vehicle comprising:
   a downward extending frame;
   a rear wheel pivot section provided on the downward frame;
   a rear wheel suspension device arranged to support a rear wheel such that the rear wheel can pivot substantially upward and downward around the rear wheel pivot section;
   a power unit; and
   foot rests projecting in a width direction of the vehicle, wherein a rear wheel pivot section width $(W_P)$ as a width of the rear wheel pivot section in the vehicle width direction, a foot rest width $(W_{FR})$ as a width of the foot rests in the vehicle width direction, and a rear wheel width $(W_T)$ as a width of the rear wheel in the vehicle width direction have a relationship of: the foot rest width $(W_{FR}) \geqq$ the rear wheel pivot section width $(W_P) \geqq$ the rear wheel width $(W_T)$; wherein
   the rear wheel pivot section is disposed entirely before the power unit in the advancing direction of the vehicle.

2. A saddle type vehicle according to claim 1, wherein the rear wheel pivot section includes an elastic member, and the rear wheel suspension device is connected to the downward frame via the elastic member.

3. A saddle type vehicle according to claim 2, wherein the rear wheel pivots about the rear wheel pivot section at a first axis, and further wherein the rear wheel pivots about a second axis substantially perpendicular to the first axis due to deformation of the elastic member.

4. A saddle type vehicle according to claim 1, wherein the rear wheel suspension device includes a connecting member and an arm member, the connecting member being connected to the rear wheel pivot section, a first end of the arm member being connected to a back end of the connecting member, a second end of the arm member arranged to support the rear wheel, and wherein the connecting member and the arm member are releasably connected to each other.

5. A saddle type vehicle according to claim 4, wherein the power unit is connected to at least one of the connecting member and the arm member such that the power unit can pivot with the rear wheel suspension device.

6. A saddle type vehicle according to claim 4, further comprising a rear shock absorber unit, wherein the rear shock absorber unit is connected to the second end of the arm member.

7. A saddle type vehicle according to claim 1, further comprising a rear shock absorber unit, wherein the rear shock absorber unit is mounted forward of the rear wheel in the advancing direction of the vehicle.

8. A saddle type vehicle according to claim 1, wherein the downward frame further comprises front wheel arms arranged to support a front wheel of the saddle type vehicle such that the front wheel can move substantially upwards and downwards.

9. A saddle type vehicle according to claim 8, wherein the downward frame further comprises a steering shaft support member and a steering shaft, wherein the front wheel arms include a first front arm member and a second front arm member, first ends of the first and second front arm members connected to the steering shaft, second ends of the first and second front arm members connected to a first front wheel pivot section and a second front wheel pivot section, respectively.

10. A saddle type vehicle comprising:
    a downward frame arranged to support a steering shaft;
    a rear wheel pivot section provided on the downward frame;
    a rear wheel suspension device arranged to support a rear wheel such that the rear wheel can pivot substantially upward and downward around the rear wheel pivot section;
    a power unit;
    a rear shock absorber unit mounted forward of the rear wheel in the advancing direction of the vehicle; and
    foot rests projecting in a width direction of the vehicle, wherein a rear wheel pivot section width $(W_P)$ as a width of the rear wheel pivot section in the vehicle width direction, a foot rest width $(W_{FR})$ as a width of the foot rests in the vehicle width direction, and a rear wheel width $(W_T)$ as a width of the rear wheel in the vehicle width direction have a relationship of: the foot rest width $(W_{FR}) \geqq$ the rear wheel pivot section width $(W_P) \geqq$ the rear wheel width $(W_T)$; wherein
    the rear wheel pivot section is disposed entirely before the power unit in the advancing direction of the vehicle; and
    the power unit is attached to the rear wheel suspension device such that the power unit can pivot with the rear wheel suspension device.

11. A saddle type vehicle according to claim 10, wherein the rear wheel pivot section includes an elastic member, and the rear wheel suspension device is connected to the downward frame via the elastic member.

12. A saddle type vehicle according to claim 11, wherein the rear wheel pivots about the rear wheel suspension device on a first axis, and the elastic member allows the rear wheel suspension device and the rear wheel to pivot about the rear wheel pivot section about a second axis that is substantially perpendicular to the first axis.

13. A saddle type vehicle according to claim 10, wherein the downward frame further comprises front wheel arms arranged to support a front wheel of the saddle type vehicle such that the front wheel can move substantially upwards and downwards.

14. A saddle type vehicle according to claim 10, wherein the downward frame further comprises front wheel arms arranged to support a front wheel of the saddle type vehicle, wherein the front wheel arms include a first front arm member and a second front arm member, first ends of the first and second front arm members connected to the steering shaft, second ends of the first and second front arm members connected to a first front wheel pivot section and a second front wheel pivot section, respectively.

15. A saddle type vehicle comprising:

a downward frame including a steering shaft and front wheel arms arranged to support a front wheel of the saddle type vehicle such that the front wheel can move substantially upwards and downwards;

a rear wheel pivot section provided on the downward frame;

a rear wheel suspension device arranged to support a rear wheel such that the rear wheel can pivot substantially upward and downward around the rear wheel pivot section;

a power unit;

a rear shock absorber unit mounted forward of the rear wheel in the advancing direction of the vehicle; and foot rests projecting in a width direction of the vehicle, wherein a rear wheel pivot section width ($W_P$) as a width of the rear wheel pivot section in the vehicle width direction, a foot rest width ($W_{FR}$) as a width of the foot rests in the vehicle width direction, and a rear wheel width ($W_T$) as a width of the rear wheel in the vehicle width direction have a relationship of: the foot rest width ($W_{FR}$) ≧ the rear wheel pivot section width ($W_P$) ≧ the rear wheel width ($W_T$); wherein the rear wheel pivot section is disposed entirely before the power unit in the advancing direction of the vehicle; and the power unit is attached to the rear wheel suspension device such that the power unit can pivot with the rear wheel suspension device.

16. A saddle type vehicle according to claim 1, wherein the rear wheel pivot section includes an elastic member, and the rear wheel suspension device is connected to the downward frame via the elastic member.

* * * * *